(12) United States Patent
Allendorf et al.

(10) Patent No.: US 8,944,111 B2
(45) Date of Patent: Feb. 3, 2015

(54) PIPE PITCH APPARATUS, SYSTEM AND METHOD OF INSTALLATION

(75) Inventors: Eric Allendorf, West Haven, CT (US); John Poplawski, Meridan, CT (US)

(73) Assignee: The Midsun Group, Southington, CT (US)

( * ) Notice: Subject to any disclaimer, the term of this patent is extended or adjusted under 35 U.S.C. 154(b) by 514 days.

(21) Appl. No.: 13/328,293

(22) Filed: Dec. 16, 2011

(65) Prior Publication Data
US 2013/0019985 A1   Jan. 24, 2013

Related U.S. Application Data

(63) Continuation-in-part of application No. 13/185,686, filed on Jul. 19, 2011.

(51) Int. Cl.
*F16L 3/26* (2006.01)
*F16L 3/13* (2006.01)
*F16L 3/223* (2006.01)
*F16L 3/02* (2006.01)
*F16L 3/22* (2006.01)
*F16L 3/24* (2006.01)

(52) U.S. Cl.
CPC ............... *F16L 3/13* (2013.01); *F16L 3/2235* (2013.01); *F16L 3/02* (2013.01); *F16L 3/221* (2013.01); *F16L 3/24* (2013.01)

USPC .............................. 138/106; 248/70

(58) Field of Classification Search
CPC ............... F16L 3/13; F16L 3/24; F16L 3/02; F16L 3/06; F16L 3/08; F16L 3/085; F16L 3/20; F16L 3/22; F16L 3/127; F16L 3/221; F16L 3/222; F16L 3/223; F16L 3/237; F16L 3/2235
USPC ............... 138/103, 106, 107; 248/70
See application file for complete search history.

(56) References Cited

U.S. PATENT DOCUMENTS

| | | | |
|---|---|---|---|
| 3,767,149 A * | 10/1973 | Hill | 248/49 |
| 3,809,348 A * | 5/1974 | Di Laura | 248/49 |
| 6,250,847 B1 * | 6/2001 | Bingham, Jr. | 405/184.4 |
| 6,799,607 B1 * | 10/2004 | Friedline et al. | 138/106 |
| 8,356,778 B2 * | 1/2013 | Birli et al. | 248/73 |

* cited by examiner

*Primary Examiner* — J. Casimer Jacyna
(74) *Attorney, Agent, or Firm* — Joseph R. Carvalko

(57) ABSTRACT

An apparatus, system and method of installation of a pipe in fixed association with at least one stanchion, said stanchion having a pipe mount for fixing the distance from a pipe inserted into the pipe mount to a mounting surface, and when two or more stanchions and associated pipe mounts are used to insert a pipe, the distance between the pipe mounts and the mounting surface create a pitch of the pipe in the direction of the sink and away from the source of a liquid insures the proper rate of gravitational flow of the liquid therein.

6 Claims, 5 Drawing Sheets

PIPE PITCH APPARATUS, SYSTEM AND METHOD OF INSTALLATION

CROSS-REFERENCE TO RELATED APPLICATIONS

This is a continuation-in-part of and claims the priority benefit under 35 U.S.C. 120 of U.S. patent application Ser. No. 13/185,686 entitled Pipe Pitch Article, System and Method of Installation, filed Jul. 19, 2011, the entire disclosure of which is hereby incorporated by reference.

FIELD OF THE INVENTION

This application relates generally to pipes employed in installations in buildings and other facilities that utilize piping systems for the transport of liquids.

BACKGROUND OF THE INVENTION

This invention provides an article, system and an installation method to insure that the proper pitch is employed in piping systems for the transport of liquids, typically constructed from plastic formulated pipes, such as a polyvinylchloride (PVC) and used in homes, offices and other facilities, generally. Although potable water and waste water, are the most frequent substance transported other fluids such as natural gas and gasoline are transported from one location to another via complex networks of pipes. These networks of pipes typically include long, relatively straight lines that enter into and exit from enclosed spaces, with occasionally intersected branches, and that may additionally bend around various enclosure walls and support structures, making it difficult to maintain a decreasing elevation as the piping progresses over its intended route. One problem with the use of piping systems is to insure that the pitch is in the direction of the sink and away from the source to insure the proper rate of flow and that liquid does not stagnate or worse, have impeded flow because pipes are pitched in the wrong direction. Presently there does not exist any device that insures a fool-proof means to install piping, especially in a rapid production fashion, that guarantees that the piping system is pitched properly, can be installed properly by a relatively unskilled work-force and is virtually no more expensive than the product without such advantages. With the foregoing in mind, the present invention will be distinguished over the prior art in the description and application of new components, design criteria and utility to the field of the invention.

SUMMARY OF THE INVENTION

This invention provides a novel apparatus in for holding a pipe in fixed association with a mounting surface. It is used for constructing a piping system including a least one stanchion, said stanchion having affixed thereto a pipe mount, vertically adjustable on the stanchion, for fixing a dimension from the pipe mount to a stanchion mounting surface. The apparatus may include two or more stanchions and associated pipe mounts that are used to insert the pipe, the distance between the pipe mounts and the mounting surface designed to create a pitch of the pipe in the direction of the sink and away from the source of a liquid to insure the proper rate of gravitational flow.

The stanchion attaches at one end directly to a support such as a floor or ceiling. Affixed to the stanchion is an adjustable pipe mount having a recess (usually in the shape of a cylindrical pipe) such that when a pipe is inserted within the curvature of the recess, the pipe is secure. The position of the pipe mount on the stanchion serves to establish a fixed distance between the pipe relative to the mounting surface, such that when the pipe is mounted in the pipe mount recess as an element of a piping system, a pitch of the piping system is provided in the direction of the sink and away from the source of a liquid to insure the proper rate of gravitational flow. In what follows, when the dimension of the stanchion is referred to, it is meant to include the added dimensions of any boss, or a mounting foot if used.

This invention also relates to a system for pipe installation including one or more pipes, each of which pipe is in fixed association with two or more stanchions, and its related pipe mount, said stanchions having a mounting foot for affixing the foot to a mounting surface, each said pipe mount adjusted to set a vertical distance from the pipe mounted thereon to the mounting surface.

The stanchion included herein is comprised of three parallel vertical beams, a center beam for guiding the pipe holder mount, and two outer beams, one on each side of the center beam, having teeth to engage a corresponding set of teeth on the pipe mount for securing the pipe holder in position and thus fixing a pipe a measured distance from the mounting surface. The mounting surface referred to is generally horizontally positioned, however in certain applications the surface may be vertically positioned, as described below.

The invention herein further refers to a method for pipe installation including, mounting one or more pipes each said pipe in fixed association with a two or more stanchions, said stanchions having a mounting foot and a pipe mount, for establishing a fixed distance between the pipe mounted in the recess relative to the mounting surface, in a piping system to provide a pitch of the one or more pipes in the direction of the sink and away from the source of a liquid to insure the proper rate of gravitational flow.

BRIEF DESCRIPTION OF THE DRAWINGS

This invention is best understood from the following detailed description when read in connection with the accompanying drawing. The various features of the drawing are not specified exhaustively. On the contrary, the various features may be arbitrarily expanded or reduced for clarity. Included in the drawing are the following figures.

DETAILED DESCRIPTION OF THE INVENTION

Figure 1:
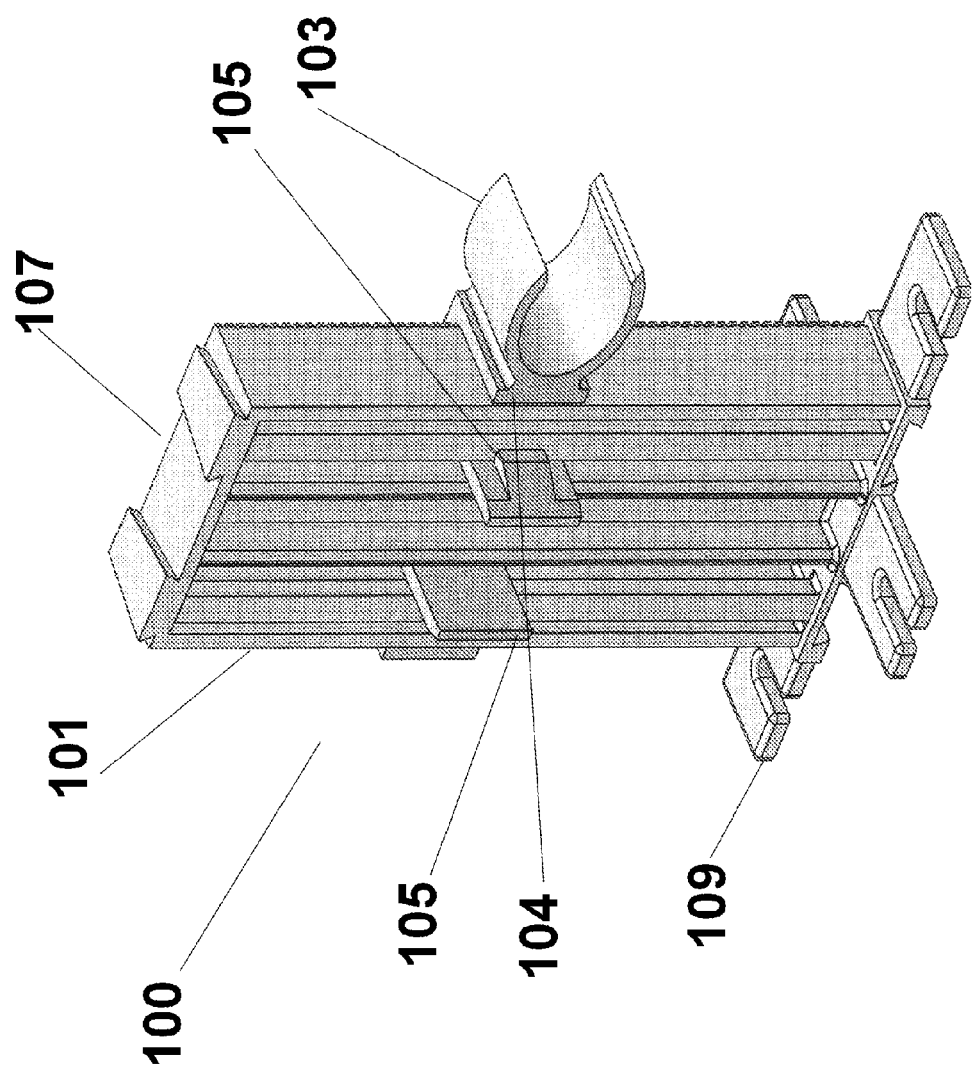
FIG. 1 illustrates a perspective view of the pipe pitch apparatus in accordance with one embodiment of the present invention.

FIG. 1 shows a perspective view of the pipe pitch apparatus 100 in accordance with one embodiment of the present invention. Stanchion 101 is used as the mounting device for a pipe mount 104 to hold by way of example and not limitation a common pipe for transporting liquids. The pipe mount 104 is secured to the stanchion 101 via a U-channel (See, FIG. 3), a tab 105 and the intermeshing of teeth (FIG. 2(d)). A mounting foot 109 secures the stanchion to a plane surface, such as a floor, ceiling or wall, affixing foot 109 to a mounting surface utilizing a fastener, such as a nail or screw, all by way of example. A pipe recess 103 secures a pipe once inserted into the opening. The stanchion can be ganged or extended by placing a stanchion having a dove tail into the slot 107.

Figure 2:
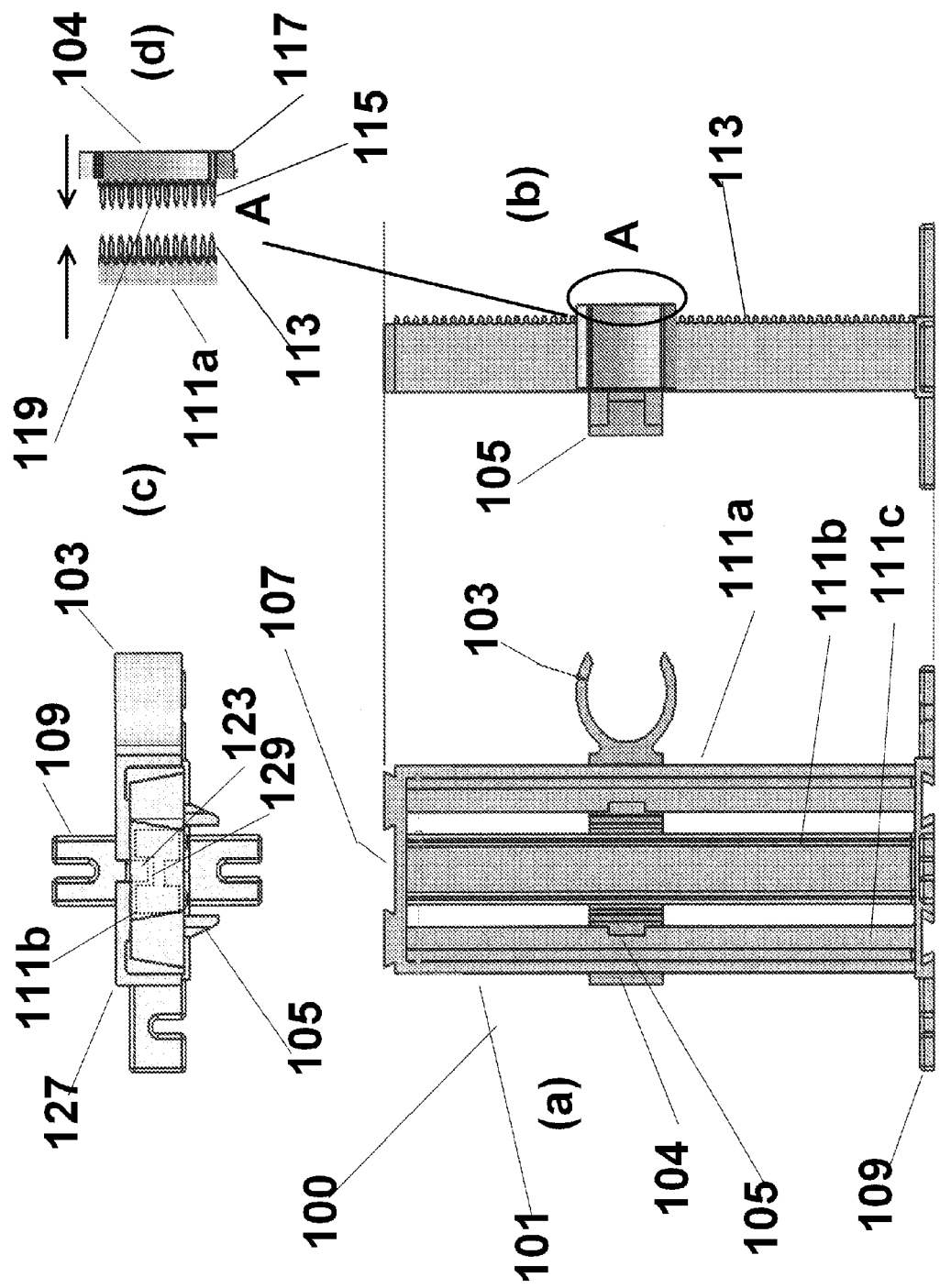
FIG. 2 (a, b, c, d) illustrates plan views the pipe pitch apparatus and system in accordance with one embodiment of the present invention FIG. 3 (a, b, c) illustrates plan and perspective views the pipe holder in accordance with one embodiment of the present invention

FIGS. 2 a, b, c and d illustrates plan views of the apparatus 100. FIG. 2 (a) show the frontal view of the Stanchion 101 comprising three beams, 111a, 111 b, and 111c and having mounted thereon the pipe mount 104. A tab 105 serves to fix U-channel 125 (FIG. 3 (b)) once it is inserted into the spaces between the two outer beams and the central beam of the stanchion. The side view FIG. 2 (d) and FIG. 2 (b) and corresponding Section A view, shows teeth 113 situated on beam 111a that intermesh with teeth 115 that are situated on the rear interior 119 section 117 of the pipe mount 104 as illustrated in FIG. 2 (d). (Note: the separation between the teeth 113 and teeth 115 in FIG. 2 (c) is only shown to clarify the two sets of teeth).

Figure 3:
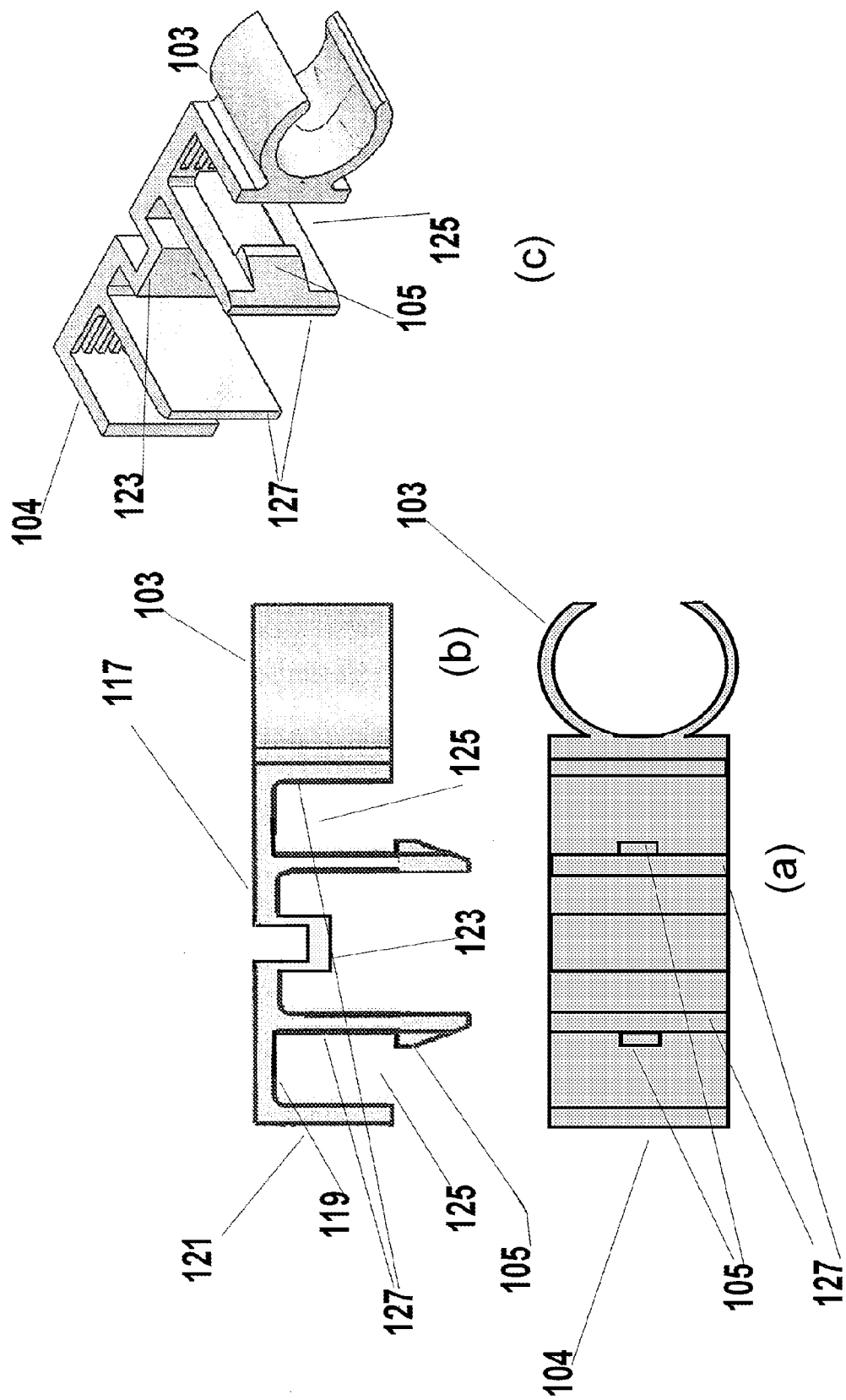

FIG. 3 (a, b) are plan views and FIG. 3 (c) is a perspective view of the pipe mount 104 that affixes to the stanchion 101. As shown in FIG. 3, a rail 123 is inserted into a rectangular channel 129 shown in FIG. 2 (c), and FIG. 4 Section A in the rear of I-beam 111b that extends from the top of the stanchion 101 to the mounting foot 109. The rail 123 and the channel 129 provide added support to the pipe mount 104, and increase its load bearing capacity.

Returning to FIG. 3, U-channel 125 is spring loaded due to the material of the pipe mount 104, and the dimension of the U-channel relative to the beam 111a and beam 111c, respectively over which the U-channel fits. Once the U-channel 125 members 121, 127 slide into the beam 111a and 111b, respectively the tab 105 secures member 127 by gripping the front surface of 111a and beam 111c, respectively to retains the pipe mount 104 fixed along the horizontal cross-section of the stanchion 101.

Figure 4:
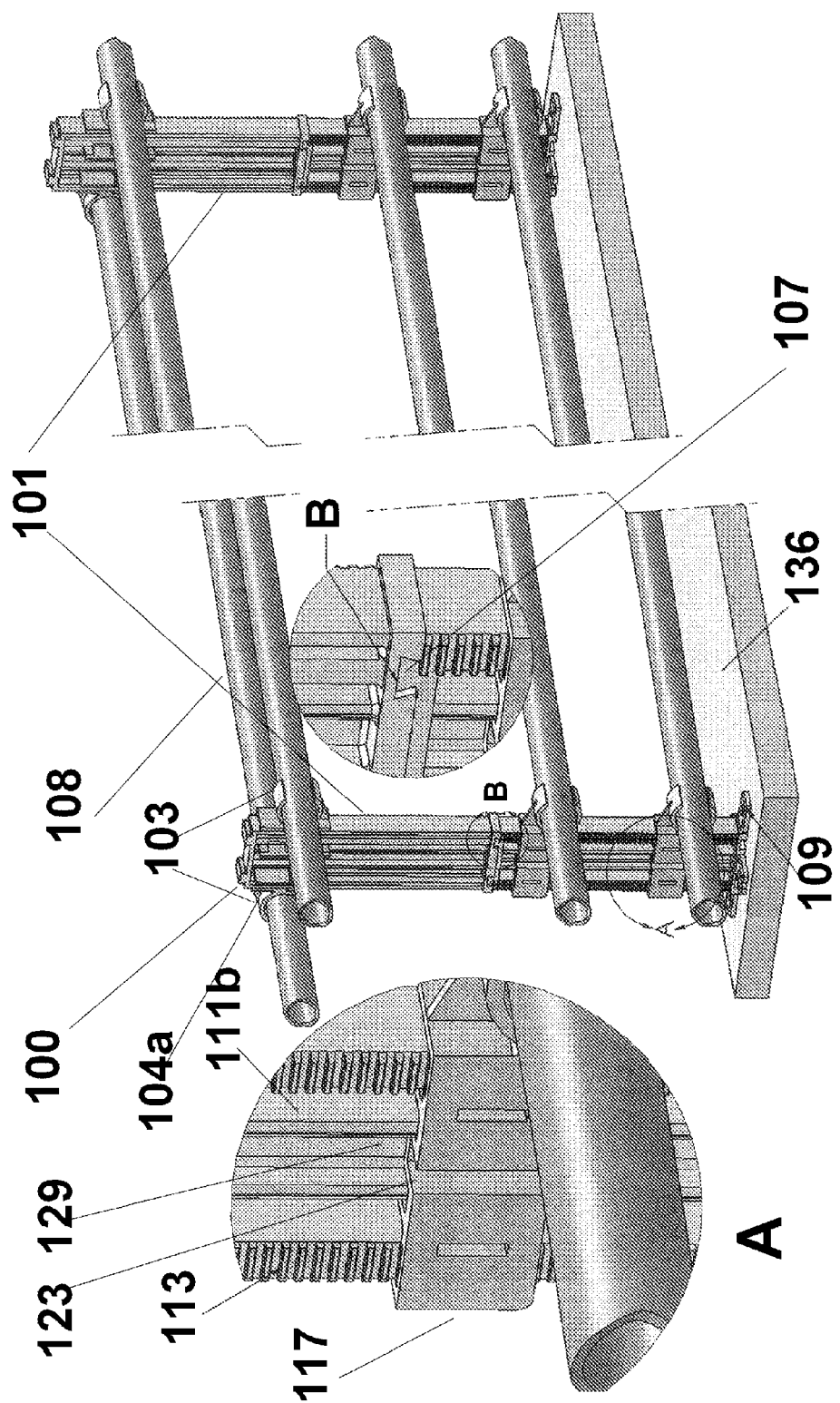
FIG. 4 illustrates the pipe pitch apparatus and system in accordance with one embodiment of the present invention.

Turning to FIG. 2 and FIG. 4 Section A, the pipe mount 104 is fixed along the vertical or length-wise dimension of the stanchion with the aid of the intermeshing of teeth 115 affixed to the pipe mount 104 and the teeth 113 affixed to the beams 111a, and 111c rear surfaces, respectively.

Figure 5:
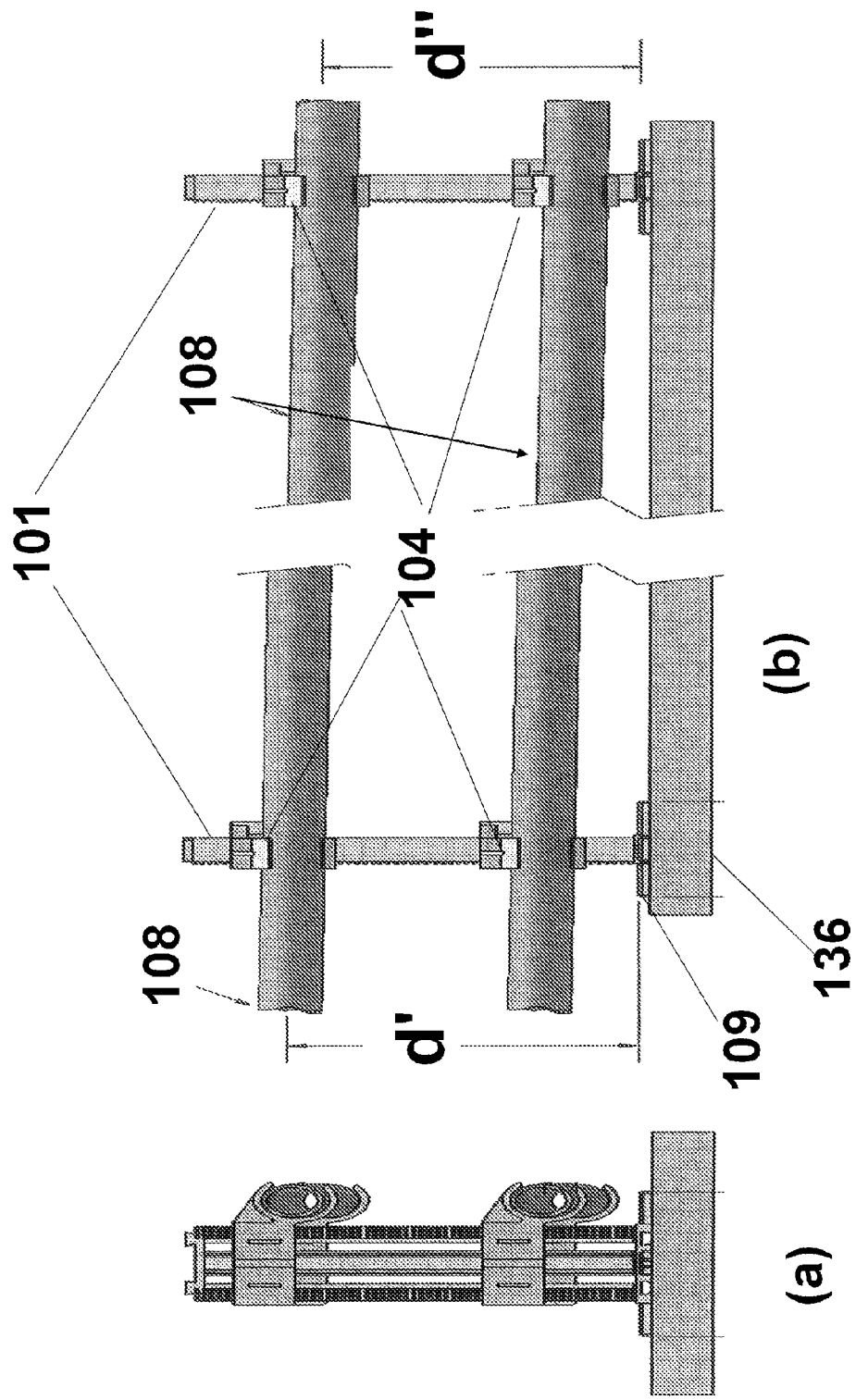
FIG. 5 (a, b) illustrates the pipe pitch apparatus and system in accordance with one embodiment of the present invention.

As shown in FIG. 4 and FIG. 5 related pipe 108 used in a series of piping, creates a piping system. The pipes of this invention may be represented by a through-pipe that may be inserted into a female portion of a union to achieve longer length or pipe runs. The pipes as the term is used in reference to this invention also may be represented by the union itself, i.e., the pipe-section having a female portion to accept longer pipes having smaller diameters than the receptacle into which it fits. By way of example, the pipes 108 illustrated in FIG. 4 may be designed to connect to other pipes through unions to extend the overall length of the pipe 108. Furthermore, the invention, by way of example and not limitation, includes pipes such as a through pipe-section, a nipple, an insert, a union, a bulkhead fitting, a conduit, or valve. Additionally, as by way of example pipes 108 may have sizes referred to in the plumbing industry as Schedule 40 or Schedule 80, among other sizes as may exist in other industries. Those of ordinary skill in the art of plumbing are familiar with the different styles, products and uses of the various types of piping.

FIG. 4 further illustrates on embodiment of the invention where a pipe 108 is in fixed association with at least one stanchion 101, the stanchion having a pipe mount 104 for affixing the pipe 108. Stanchion foot 109 mounts the stanchion 101 of the element or structure 136 of a building. As shown in FIG. 4 Section B, the stanchion 101 may be extended in varying fixed lengths, through dove-tailing using a dove tail 107. Also, as shown the pipe mount 104 may contain one or more pipe holding devices 103.

Referring to FIG. 5, when one or more of the pipe 108 are mounted, at different heights on the stanchion 101 utilizing the pipe mount 104 as by way of example as shown, a pitch of the pipe 108 is achieved, as illustrated by the differences in the vertical dimension d', d" from the centerline of the pipe 108 to the mounting foot 109 in the piping system, relative to the mounting surface 136 in the direction of a sink and away from the source of a liquid insures the proper rate of gravitational flow.

The apparatus 100 of the invention including its component parts, such as the stanchion 101 and pipe mount 104, may be manufactured, by way of example and not limitation, from one of: any plastic, such as by way of example, Polyoxymethylene (Delrin, a registered trademark of E.I. du Pont de Nemours and Company) polyvinyl chloride PVC, chlorinated polyvinyl chloride CPVC, cast iron, or copper.

As indicated the invention herein also includes a method for pipe installation in a piping system including: mounting one or more pipes each of said pipe in fixed association with a two or more stanchions, said stanchions having a mount; affixing the mount to a mounting surface, each stanchion having at least one pipe mount for establishing pitch between the pipe relative to the mounting surface. The method for pipe installation further includes supporting a pipe length at intervals having increasing dimensions between the pipe and the surface mount dependent on the interval length.

While the present invention has been described with reference to the illustrative embodiments, this description is not intended to be construed in a limiting sense. Various modifications of the illustrative embodiments, as well as other embodiments of the invention, will be apparent to those skilled in the art in reference to this description. It is expressly intended that all combinations of those elements that perform substantially the same function in substantially the same way to achieve the same results are within the scope of the invention. Substitutions of elements from one described embodiment to another are also fully intended and contemplated. It is therefore contemplated that the appended claims will cover any such modifications or embodiments as fall within the true scope of the invention.

We claim:

1. An apparatus for constructing a piping system comprising: a least one vertical stanchion, the stanchion including three parallel vertical beams, a center beam for guiding the pipe holder mount, and two outer beams, one on each side of the center beam, said stanchion having affixed thereto a vertically adjustable pipe mount secured to the stanchion via a spring loaded U-channel inserted into the spaces between the two outer beams and the central beam via a tab and a set of intermeshing teeth on said U-channel and at one end of the stanchion having a foot for mounting to a plane surface in order to secure a pipe affixed to the pipe mount at a fixed dimension between the pipe mount and the plane surface and a slot for mounting at the opposite end of the stanchion an additional stanchion to extend the vertical height of the apparatus.

2. The apparatus of claim 1, wherein when two or more stanchions and associated pipe mounts are used to insert a pipe, the distance between the pipe mounts and the mounting surface create a pitch of the pipe in the direction of the sink and away from the source of a liquid to insure the proper rate of gravitational flow.

3. The apparatus of claim 1, wherein the material of manufacture is one of: Polyoxymethylene, polyvinyl chloride PVC, chlorinated polyvinyl chloride CPVC, cast iron, or copper.

4. The apparatus of claim 1, wherein the pipe mount contains one or more pipe holding devices.

5. The apparatus of claim 1, wherein a wherein a pipe recess secures a pipe to the pipe mount.

6. The apparatus of claim 1, wherein a first stanchion is extended vertically by placing it in fixed association with a second stanchion, each such stanchion have a respective dove tail and associated slot for mating.

\* \* \* \* \*